United States Patent
Deniau et al.

(10) Patent No.: US 12,017,863 B2
(45) Date of Patent: Jun. 25, 2024

(54) CONVEYOR BELT MONITORING FOR TEMPERATURE, RIP DETECTION AND SPEED

(71) Applicant: ContiTech Transportbandsysteme GmbH, Hannover (DE)

(72) Inventors: Jean-Christophe Deniau, Fenton, MI (US); Alia Jane Pierce, Auburn Hills, MI (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 128 days.

(21) Appl. No.: 17/756,961

(22) PCT Filed: Dec. 15, 2020

(86) PCT No.: PCT/EP2020/086269
§ 371 (c)(1),
(2) Date: Jun. 6, 2022

(87) PCT Pub. No.: WO2021/122632
PCT Pub. Date: Jun. 24, 2021

(65) Prior Publication Data
US 2023/0010627 A1    Jan. 12, 2023

Related U.S. Application Data

(60) Provisional application No. 62/949,460, filed on Dec. 18, 2019.

(51) Int. Cl.
*B65G 43/02* (2006.01)
*B65G 15/34* (2006.01)
*G01N 27/82* (2006.01)

(52) U.S. Cl.
CPC ............. *B65G 43/02* (2013.01); *B65G 15/34* (2013.01); *G01N 27/82* (2013.01); *B65G 2203/0291* (2013.01); *B65G 2203/043* (2013.01)

(58) Field of Classification Search
CPC ................... B65G 43/02; B65G 15/34; B65G 2203/0275; B65G 2203/042; G01N 27/82
(Continued)

(56) References Cited

U.S. PATENT DOCUMENTS

| | | | |
|---|---|---|---|
| 3,899,071 A | 8/1975 | Duffy | |
| 6,158,576 A | 12/2000 | Eagles et al. | |

(Continued)

FOREIGN PATENT DOCUMENTS

| | | |
|---|---|---|
| GB | 2429789 A | 3/2007 |
| WO | 2008090521 A1 | 7/2008 |

OTHER PUBLICATIONS

International Search Report and Written Opinion dated Mar. 29, 2021 of International Application PCT/EP2020/086269 on which this application is based.

*Primary Examiner* — James R Bidwell
(74) *Attorney, Agent, or Firm* — Gregory J. Adams; Richard A. Wolf (57) ABSTRACT

A conveyor belt monitoring system includes a field generation array, a sensor array and circuitry. The field generation array is configured to generate a magnetic field. The sensor array is positioned a conveyor distance downstream from the field generation array and configured to measure a remaining magnetic field of a conveyor belt, the sensor array may include a series of sensors. The circuitry is configured to determine conveyor belt characteristics of the conveyor belt based on the measured remaining magnetic field.

13 Claims, 8 Drawing Sheets

(58) Field of Classification Search
USPC .................................................. 198/810.02
See application file for complete search history.

(56) References Cited

U.S. PATENT DOCUMENTS

| | | | | |
|---|---|---|---|---|
| 6,581,755 | B1 * | 6/2003 | Wilke | B65G 43/02 |
| | | | | 198/810.04 |
| 6,633,159 | B1 * | 10/2003 | Robar | B66B 7/123 |
| | | | | 324/242 |
| 7,275,637 | B2 * | 10/2007 | Brown | G01N 27/83 |
| | | | | 198/810.02 |
| 8,074,789 | B2 * | 12/2011 | May | B65G 43/02 |
| | | | | 198/810.02 |
| 9,199,800 | B2 * | 12/2015 | Alport | B65G 43/02 |
| 2010/0025198 | A1 | 2/2010 | Wallace et al. | |

* cited by examiner

CONVEYOR BELT MONITORING FOR TEMPERATURE, RIP DETECTION AND SPEED

FIELD

The field to which the disclosure generally relates is conveyor belts and conveyor belt monitoring.

BACKGROUND

Conveyor belt systems can be used to move a variety of materials from one location to another. They are a relatively low cost and labor saving technique for moving material without unloading or loading to intermediary containers or shipping systems.

The systems typically include a number of pulleys and one or more belts that wrap around pulleys. The belts are movable based on the rotatable pulleys and cause material or loads to be moved.

These conveyor belts are often used in harsh environments or conditions, such as high temperature, high loads, dust, debris and the like. These harsh conditions can cause undesirable wear or damage to the belts. In order to mitigate shutting downs an entire conveyor belt system, monitoring systems can be used to detect wear or damage to the belts. The monitoring systems may be expected to operate accurately for extended periods of time, such as 2-20 years.

However, the harsh conditions can also damage electronics, such as circuitry and sensors, used in the monitoring systems. The conditions that cause damage to the conveyor belt may damage the electronics.

Additionally, long duration applications make it difficult to implement active battery powered sensor applications due to limitations of battery size and active lifespan.

What is needed are techniques to facilitate conveyor belt monitoring systems.

DETAILED DESCRIPTION

The field to which the disclosure generally relates is rubber products and conveyor belts.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Conveyor belt systems can be used to move a variety of materials from one location to another. They are a relatively low cost and labor saving technique for moving material without unloading or loading to intermediary containers or shipping systems.

The systems typically include a number of pulleys and one or more belts that wrap around pulleys. The belts are movable based on the rotatable pulleys and cause material or loads to be moved.

These conveyor belts are often used in harsh environments or conditions, such as high temperature, high loads, dust, debris and the like. These harsh conditions can cause undesirable wear or damage to the belts. In order to mitigate shutting downs an entire conveyor belt system, monitoring systems can be used to detect wear or damage to the belts. The monitoring systems may be expected to operate accurately for extended periods of time, such as 2-20 years.

However, the harsh conditions can also damage electronics, such as circuitry and sensors, used in the monitoring systems. The conditions that cause damage to the conveyor belt may damage the electronics.

Additionally, long duration applications make it difficult to implement active battery powered sensor applications due to limitations of battery size and active lifespan.

It is appreciated that conveyor belts are widely used to transport goods, material, packages and the like for a variety of industries, such as mining, shipping, airports, manufacturing and the like.

Further, it is appreciated that conveyor belts can be exposed to heavy loads, abrasion, heating, rapid cooling, harsh environment, and the like. These factors typically affect the lifetime of the belts.

It is appreciated that other monitoring systems exist to monitor rip and surface temperature characteristics of the belts.

However, in order to monitor rip, inner temperature, and speed characteristics, different monitoring systems are installed for each characteristic. Thus, the overall system for belt monitoring is complex and costly.

One or more embodiments are disclosed that facilitate conveyor belt monitoring systems.

Figure 1:
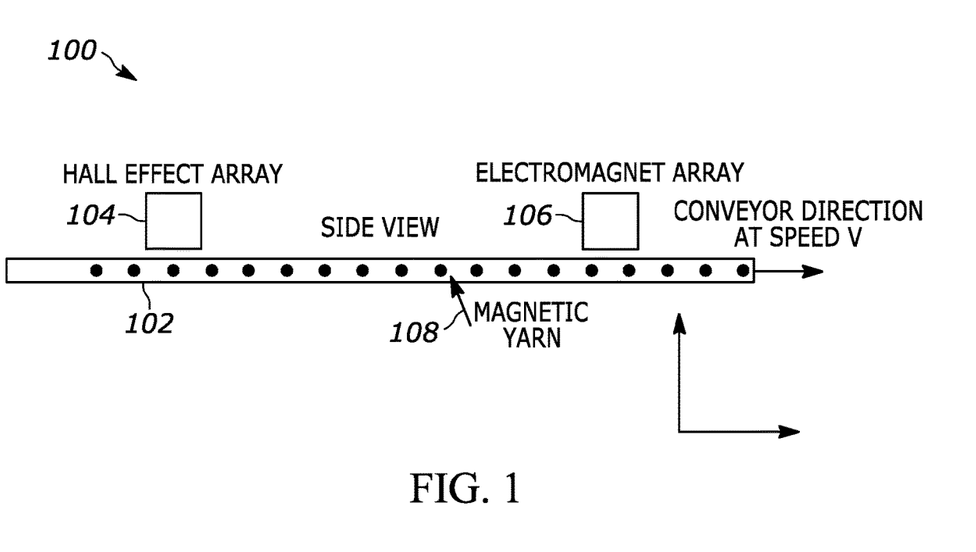
FIG. 1 is a diagram illustrating a conveyor belt monitoring system 100 in accordance with one or more embodiments.

FIG. 1 is a diagram illustrating a conveyor belt monitoring system 100 in accordance with one or more embodiments. The system 100 is provided for illustrative purposes and it is appreciated that suitable variations are contemplated. A side view of the system 100 is shown.

The system 100 includes a sensing array 104 and a field generation array 106 configured to operate on a conveyer belt, such as the conveyor belt 102.

The belt 102 is configured to have one or more magnetic yarns 108 embedded within the belt 102 according to one or more patterns. The belt 102 is moving along a conveyor direction (to the rights) at a conveyor speed V.

The field generation array 106, such as an electromagnetic array in this example, is configured to generate a magnetic field towards the belt 102. The generated field causes at least a partial magnetization or state change of the magnetic yarns 108.

The array 106 is positioned a selected distance above an upper surface of the belt 102. The array 106 can include a plurality of field generators positioned along a width of the belt 102. The array 106 provides an initial magnetic field to the yarns 108.

The sensor array 104 is configured to measure remaining magnetic properties and/or fields of the magnetic yarns 108. The sensor array 104, in one example, is a hall effect sensor array.

The sensor array 104 may comprise sensors resistant to hazardous conditions such as heat, dust, debris and the like. Some examples of suitable sensors include magnetic sensors or Hall effect sensors and/or the like.

The sensor array 104 is positioned a selected distance above an upper surface of the belt 102 and a conveyor distance away from the field generator array 106. In one example, the sensor array 104 comprises a plurality of sensors located across the belt 102 in a transverse direction to movement of the belt 102.

The system 100 includes circuitry (not shown) coupled to the sensor array 104 and the field generator array 106 and is configured to obtain and/or analyze the measured fields from the sensor array 104 and determine and/or identify belt characteristics of the conveyor belt 102 based on the measured fields, magnetic yarn patterns, the conveyor distance and the like. The belt characteristics include belt temperature, exterior belt temperature, interior belt temperature, wear, rip, rip position, belt speed (V) and the like.

One example of a suitable magnetic yarn 108 is a magnetic yarn manufactured by Triad Polymers. This yarn is made of polymers which is "mixed" with magnetic particles.

The magnetic yarn 108 can be embedded inside the conveyor belt during manufacturing in a specific pattern, referred to as a magnetic yarn pattern.

As the conveyor belt 102 passes in front of an array of electro magnets 106, the magnetic particles inside the yarn 108 are magnetized to an initial field.

At the conveyor distance away, the array 104 of analog Hall effect sensors monitors a remaining magnetic field of the magnetic yarn.

The conveyor distance is a suitable distance or space between the array 104 and the array 106. In one example, the conveyor distance is large enough to mitigate generated fields from impacting the sensor array 104.

An interruption of the remaining magnetic field typically indicates a cut in one or more of the yarns 108, which can indicate a possible rip in the conveyor belt.

Additionally, the remaining magnetic field is inversely proportional to temperature meaning the warmer the yarn, the less magnetic field. Taking into consideration the external temperature of the conveyor belt, the internal temperature can thus be deducted/determined by the circuitry.

The yarn 108 is embedded in the belt in a specific magnetic pattern to facilitate monitoring/determining the speed of the conveyor belt 102. In addition, one or more of the yarns 108 are configured as "markers" to code different position on the conveyor belts similar to binary coding. With such "markers", the location of an issue can be determined by the circuitry.

In one example, the circuitry determines the belt speed based on the markers by identifying a first marker and a subsequent marker and determining a speed at least partially based on a time between the markers. There is a known distance between the first marker and the subsequent marker of the belt 102.

Figure 2:
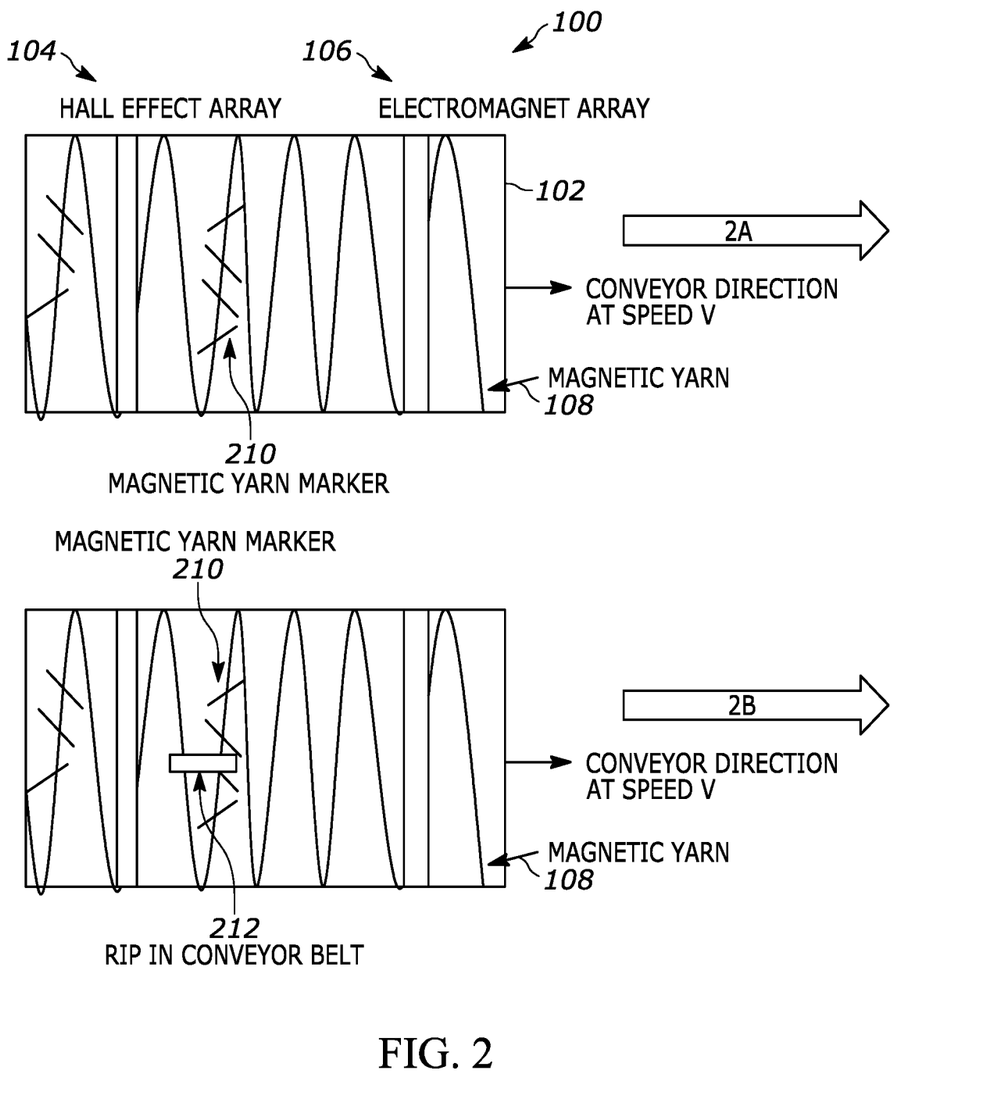
FIG. 2 is a diagram illustrating the conveyor belt monitoring system 100 in accordance with one or more embodiments.

FIG. 2 is a diagram illustrating the conveyor belt monitoring system 100 in accordance with one or more embodiments. The system 100 is provided as a top view.

The system 100 is shown in a normal state 2A and a belt rip state 2B. The rip state 2B is where there is a rip in the belt 102.

The belt 102 includes embedded magnetic yarns 108. The yarns 108 include markers 210 arranged in a pattern.

In the state 2A, there is no rip or modification of the yarn markers 210, thus the measured remaining field is as expected.

In the state 2B, there is a rip 212 in the conveyor belt 102 that disrupts or damages the markers 210. The damaged markers cause a change from an expected remaining field. The change in the remaining magnetic field is detected by the array 104.

Figure 3:
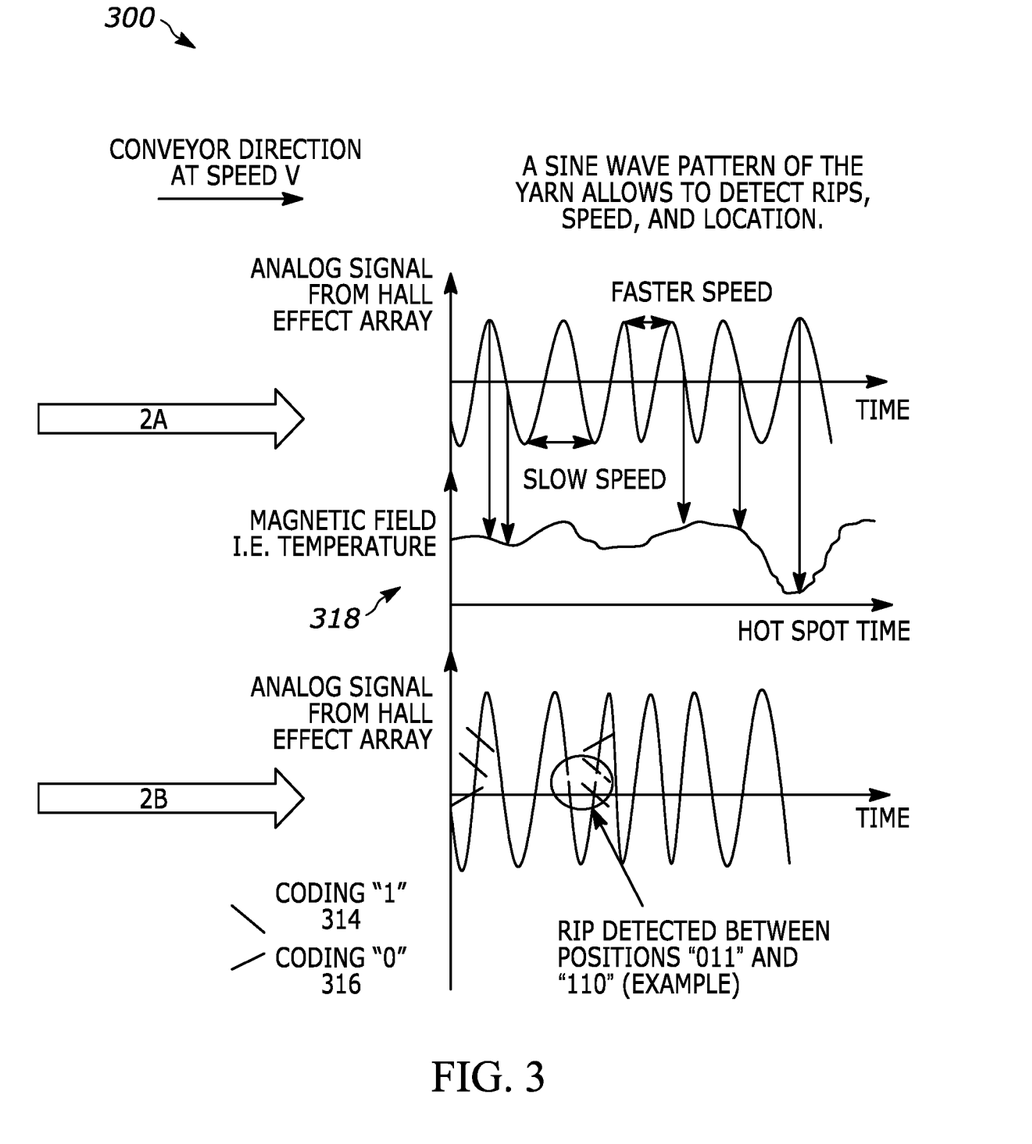
FIG. 3 is a graph 300 illustrating measured remaining fields for the conveyor belt monitoring system 100 in accordance with one or more embodiments.

FIG. 3 is a graph 300 illustrating measured remaining fields for the conveyor belt monitoring system 100 in accordance with one or more embodiments.

The graph 300 is a continuation of the system 100 depicted in FIG. 2.

An upper portion of the graph 300 depicts the remaining magnetic field for the state 2A. The field is shown with an x-axis depicting time and a y-axis depicting magnitude. Here, the remaining magnetic field is substantially continuous, which indicates that there is not a rip in the conveyor belt 102. Further, the conveyor best speed is shown as a function between peaks and/or valleys. Additionally, belt temperature is also determined.

A lower portion of the graph 300 depicts the remaining magnetic field for the state 2B. The field is shown with an x-axis depicting time and a y-axis depicting magnitude. Here, the remaining magnetic field is discontinuous and/or has a gap, which indicates that there is a rip in the conveyor belt 102.

It is appreciated that magnetic yarn 108 includes types of markers oriented to represent a coding. An example of suitable coding includes coding 314 that represents a "1" and coding 316 that represents a "0".

Figure 4:
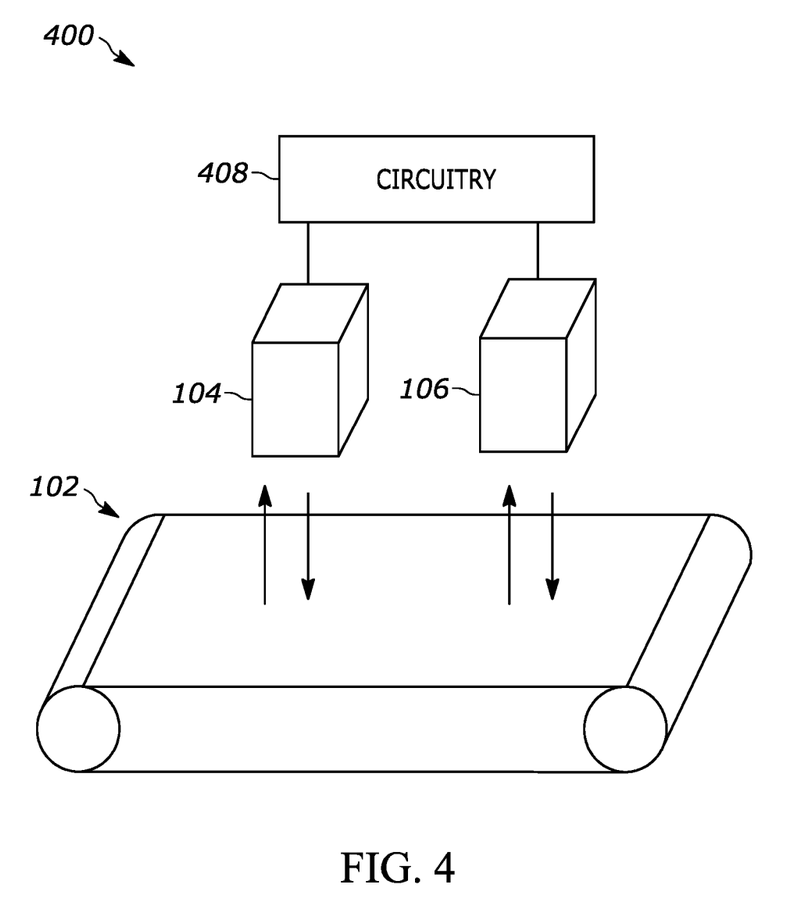
FIG. 4 is a diagram illustrating a conveyor belt monitoring system 400 in accordance with one or more embodiments.

FIG. 4 is a diagram illustrating a conveyor belt monitoring system 400 in accordance with one or more embodiments. The system 400 is provided for illustrative purposes and it is appreciated that suitable variations are contemplated.

The system 400 can be used with and/or in conjunction with the above embodiments, examples, aspects, options and/or the like shown in FIGS. 1-3. The system 400 can be implemented as an arrangement and/or apparatus.

The system 400 includes a sensing array 104 and a field generation array 106 and operates on a conveyor belt 102. The system 400 also includes circuitry 408, which can include the functionality described with regard to the circuitry described with FIG. 1.

The belt 102 here is also configured to have one or more magnetic yarns 108 embedded within the belt 102 according to one or more patterns. The belt 102 is moving along a conveyor direction at a conveyor speed V.

The field generation array 106, such as an electromagnetic array in this example, is configured to generate a magnetic field towards the belt 102. The generated field causes at least a partial magnetization or state change of the magnetic yarns 108.

The array 106 is positioned a selected distance above an upper surface of the belt 102. The array 106 can include a plurality of field generators positioned along a width of the belt 102. The array 106 provides an initial magnetic field to the yarns 108.

The sensor array 104 is configured to measure remaining magnetic properties and/or fields of the magnetic yarns 108. The sensor array 104, in one example, is a hall effect sensor array.

The sensor array 104 is positioned a selected distance above an upper surface of the belt 102 and a conveyor distance away from the field generator array 106.

The system 400 includes circuitry 408 coupled to the sensor array 104 and the field generator array 106 and is configured to obtain and/or analyze the measured fields from the sensor array 104 and determine and/or identify belt characteristics of the conveyor belt 102 based on the measured fields, magnetic yarn patterns, the conveyor distance and the like. The belt characteristics include belt temperature, exterior belt temperature, interior belt temperature, wear, rip, rip position, belt speed (V) and the like.

One example of a suitable magnetic yarn 108 is a magnetic yarn manufactured by Triad Polymers. This yarn is made of polymers which is "mixed" with magnetic particles.

The magnetic yarn 108 can be embedded inside the conveyor belt during manufacturing in a specific pattern, referred to as a magnetic yarn pattern.

As the conveyor belt 102 passes in front of an array of electro magnets 106, the magnetic particles inside the yarn 108 are magnetized to an initial field.

At the conveyor distance away, the array 104 of analog Hall effect sensors monitors a remaining magnetic field of the magnetic yarn.

An interruption of the remaining magnetic field typically indicates a cut in one or more of the yarns 108, which can indicate a possible rip in the conveyor belt.

Additionally, the remaining magnetic field is inversely proportional to temperature meaning the warmer the yarn, the less magnetic field. Taking into consideration the external temperature of the conveyor belt, the internal temperature can thus be deducted/determined by the circuitry.

The yarn 108 is embedded in the belt in a specific magnetic pattern to facilitate monitoring/determining the speed of the conveyor belt 102. In addition, one or more of the yarns 108 are configured as "markers" to code different position on the conveyor belts similar to binary coding. With such "markers", the location of an issue can be determined by the circuitry.

In one example, the circuitry 408 determines the belt speed based on the markers by identifying a first marker and a subsequent marker and determining a speed at least partially based on a time between the markers. There is a known distance between the first marker and the subsequent marker of the belt 102.

Figure 5:
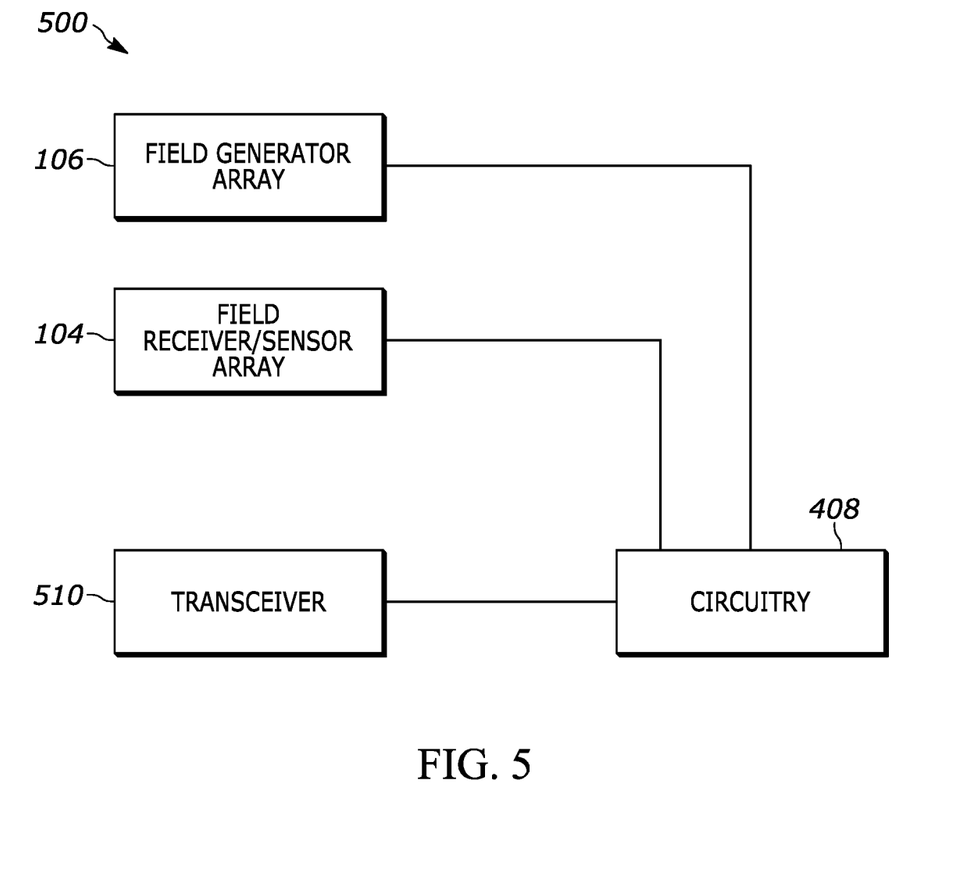
FIG. 5 is a diagram illustrating a conveyor belt monitoring system 500 in accordance with one or more embodiments.

FIG. 5 is a diagram illustrating a conveyor belt monitoring system 500 in accordance with one or more embodiments. The system 500 is provided for illustrative purposes and it is appreciated that suitable variations are contemplated. The system 500 can be implemented as an arrangement and/or apparatus.

The system 500 includes a field generation array 106, a sensing array 104, circuitry 408 and a transceiver 510.

The system 500 is similar to the system 400 and the system 100 and additionally includes the transceiver 510.

The transceiver 510 is coupled to the field generation array 106, the sensing array 104, and/or the circuitry 408. The transceiver 510 is configured to transmit measurements external to the system 500. Furthermore, the transceiver 510 is configured to receive control information for the field generation array 106 and/or the sensor array 104.

The control information can include magnitude of the generated field for the field generation array 106.

The control information can also include frequency of measurements and the like for the sensor array 104.

It is appreciated that suitable variations of the system 500 are contemplated.

It is appreciated that the magnetic yarn can be embedded during the manufacturing of the belt. The yarn is capable of withstanding very high temperature so it can be "cured" or woven during the belt manufacturing or curing process.

In one example, the yarn is a plain weave with 2 directional unidirectional fibers An example of a suitable range for distance of the sensor array from the conveyor belt is about 1 cm to 5 cm.

The number of magnetic sensors used within the sensor array is typically based on a width of the conveyor belt and/or resolution of detection. As an example, a sensor array for a one meter belt has no more than 50 magnetic sensors.

An example of a suitable range for distance of the electromagnet array from the conveyor belt is about 10 cm. Generally, the range depends on the generated magnetic field.

The number of magnets or electromagnets used depends on the width of the belt. For a 1 meter belt, 10 electromagnets should be sufficient.

In some examples or aspects, permanent magnets can be used. However, it would depend on the magnetic remanence of the magnetic yarn. If the remanence is high enough and the speed of the conveyor is fast enough, the distance between the magnet and the sensor array can be large. Thus the magnets do not affect the reading of the sensor array.

Electromagnet offer the flexibility of an ON/OFF magnetic field and a variable magnetic field.

An interruption or rip can be determined by the monitoring systems based on the yarn and magnetic properties.

As for any magnetized material, a high temperature will decrease the magnetic field until the temperature reaches the material's specific Curie point. At this point, the Weiss domains are broken and the magnetism is gone. However, the yarn seems to have a relatively stable remaining magnetic field, typically up to 350 Celsius (C).

Speed detection is performed with the periodicity of the high level of the output of each sensor of the array 104.

Yarn markers in the belt 102 are to indicate a position of a potential tear in the belt 102.

Figure 6:
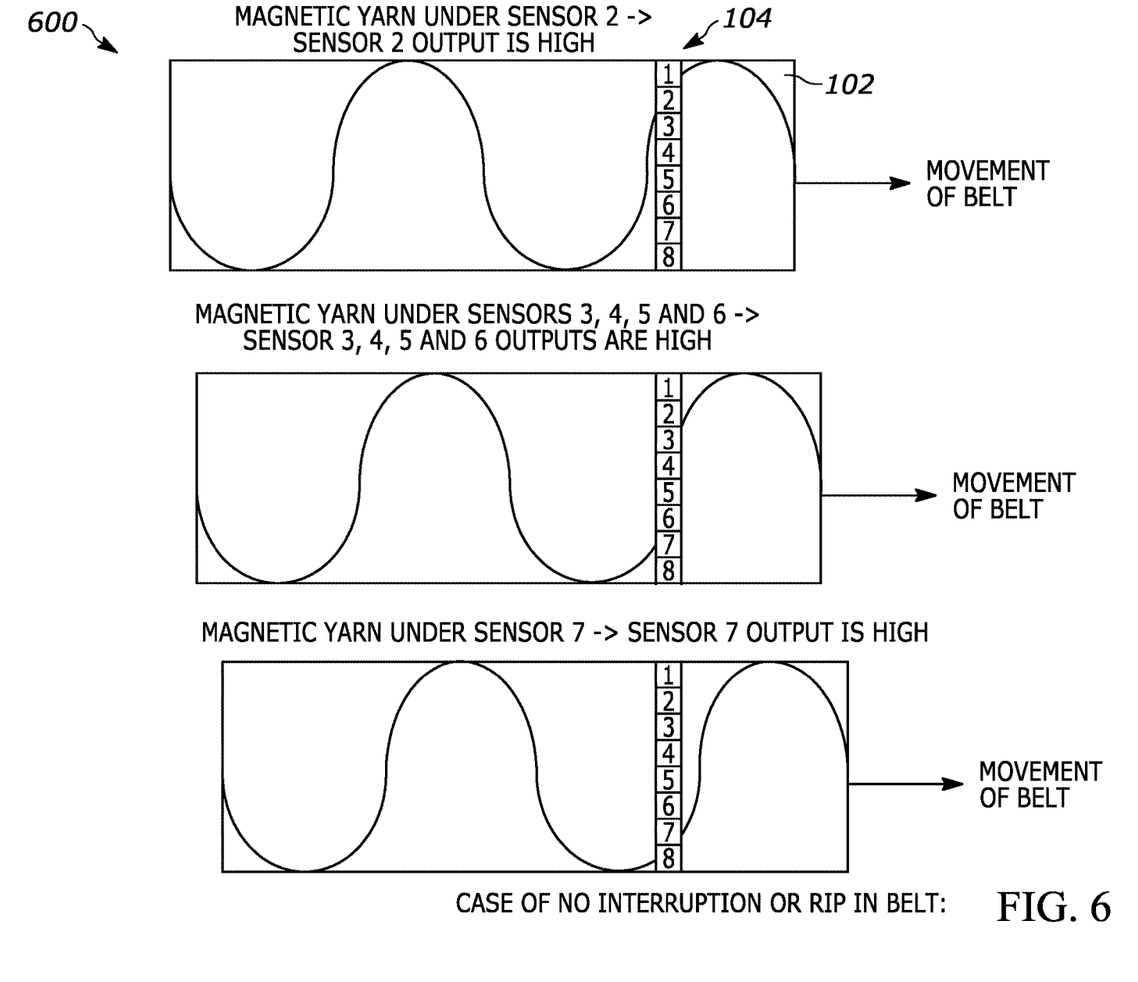
FIG. 6 is a diagram illustrating a first example operation 600 of a conveyor belt monitoring system where no interruption or rip in a belt 102 is present.

FIG. 6 is a diagram illustrating a first example operation 600 of a conveyor belt monitoring system where no interruption or rip in a belt 102 is present. The diagram is provided for illustrative purposes and it is appreciated that suitable variations are contemplated.

The monitoring system can include system 100, 500 and/or variations thereof.

In this example, the senor array 106 includes eight (8) sensors arranged in a series across the belt 102 and numbered from 1 to 8 as shown and arranged in a transverse direction from movement of the belt as shown.

A magnetic yarn 108 is embedded in the belt and meanders in an "S" pattern as shown.

The belt 102 is shown from the top in this example.

Each sensor generates a high output when a magnetic yarn is located underneath the sensor.

The diagram 600 depicts a sequence belt movement through the sensor array 104.

At a first sequence, the magnetic yarn is under sensor 2, which provides a high output while the other sensors provide a low output.

At a second sequence, the magnetic yarn is under sensors 3, 4, 5, 6 and 7, which provide high outputs while sensors 1, 2 and 8 provide low outputs.

At a third sequence, the magnetic yarn is under sensor 7, which provides a high output while the other sensors provide a low output.

At a fourth sequence, the magnetic yarn is now under sensor 8, which provides a high output while the other sensors provide a low output.

At a fifth sequence, the magnetic yarn is under sensors 5, 6 and 7, which provide a high output while the other sensors provide a low output.

Thus, the sensor array 104 provides a sequence of outputs that show the yarn position over time. The measured sequence can be matched with expected sequences and/or prior sequences. These sequences would match the expected or prior sequences as there is no rip or interruption.

Figure 7:
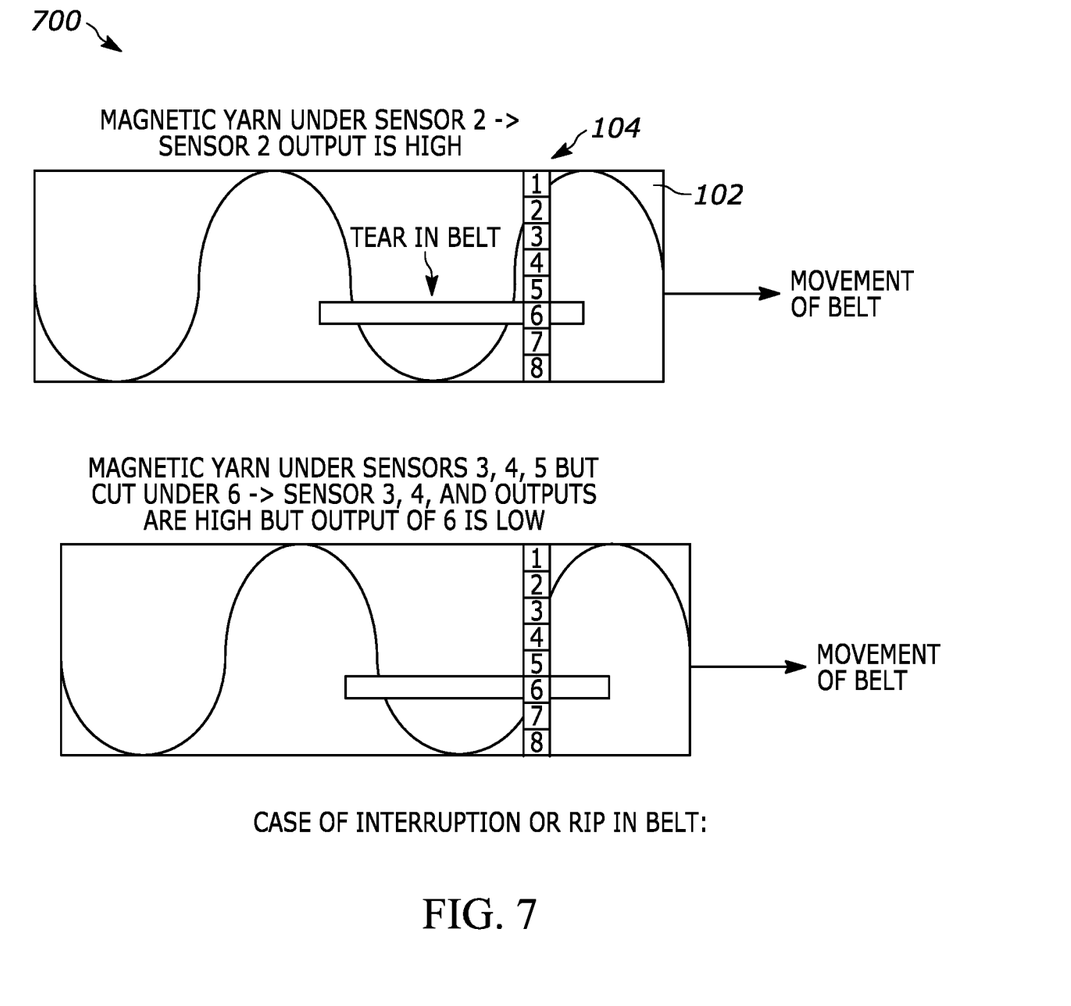
FIG. 7 is a diagram illustrating a second example operation 700 of a conveyor belt system where an interruption or rip in a belt 102 is present and is detected.

FIG. 7 is a diagram illustrating a second example operation 700 of a conveyor belt system where an interruption or rip in a belt 102 is present and is detected. The diagram is provided for illustrative purposes and it is appreciated that suitable variations are contemplated.

The second operation 700 involves the monitoring system of FIG. 6, but in a situation where the belt 102 has a rip or tear as indicated.

At a first sequence, the magnetic yarn is under sensor 2, which provides a high output while the other sensors provide a low output.

At a second sequence, the magnetic yarn is under sensors 3, 4, and 5 but is cut or ripped under sensor 6. Thus, the sensors 3, 4 and 5 provide high outputs. However, the sensor 6 provides a low output instead of an expected or prior output of high.

Comparing the measured sequence of FIG. 7 with the expected or prior sequency indicates that there is a rip under the sensor 6 at the current position.

Additional sequences also indicate the yarn missing under the sensor 6 after the next bend in the yarn.

The various sequences can be analyzed to determine the length or duration of the rip.

It is appreciated that suitable variations of the above are contemplated.

Also, in some example embodiments, well-known processes, well-known device structures, and well-known technologies are not described in detail.

Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

One or more examples of various embodiments or aspects are now shown.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a conveyor belt monitoring system. The system includes a field generation array configured to generate a magnetic field. The conveyor belt monitoring system also includes a sensor array positioned a conveyor distance downstream from the field generation array and configured to measure a remaining magnetic field of a conveyor belt, the sensor array may include a series of sensors. The conveyor belt monitoring system also includes circuitry, where the circuitry is configured to determine conveyor belt characteristics of the conveyor belt based on the measured remaining magnetic field.

Implementations may include one or more of the following features. The system where the remaining magnetic field is based on a magnetic yarn located in the conveyor belt. The circuitry is configured to detect a sequence of locations of the magnetic yarn underneath the sensor array. The circuitry is configured to compare the detected sequence of locations with an expected sequence of locations do determine a rip in the conveyor belt. The conveyor belt may include an elastomeric material such as rubber. The circuitry configured to determine a length of a rip and a location of the rip. The conveyor belt characteristics include speed, location and rip(s). The series of sensors may include a series of hall or magnetic sensors. The monitoring system can subject to hazardous conditions such as high heat. The system may include a plurality of magnetic yarn markers embedded in the conveyor belt. The circuitry is configured to detect rips, speed and location based on a sine wave pattern of an embedded yarn as the magnetic yarn. The system may include a transceiver. The circuitry is configured to signal conveyor belt characteristics using the transceiver. The magnetic yarn has a selected pattern within the conveyor belt. The pattern is an s pattern. The magnetic yarn has a plurality of orientations based on a coding. The sensor array is configured to detect a plurality of codings from the measured remaining magnetic field. Implementations of the described techniques may include hardware, a method or process, or computer software on a computer-accessible medium.

What is claimed is:

1. A conveyor belt monitoring system comprising:
a field generation array configured to generate a magnetic field;
a plurality of magnetic yarns positioned within a conveyor belt;
a plurality of markers of the plurality of magnetic yarns configured as markers and having an orientation based on a plurality of codings;
a sensor array positioned downstream from the field generation array and configured to measure a remaining magnetic field of the conveyor belt and measure temperature of the conveyor belt, the sensor array comprising a series of sensors;
a transceiver connected to the sensor array and configured to transmit the measured remaining magnetic field and the measured temperature of the conveyor belt;
circuitry, where the circuitry is configured to determine the plurality of codings based on the measured remaining magnetic field, marker locations based on the plurality of codings and conveyor belt characteristics of the conveyor belt based on the measured remaining magnetic field and the yarn locations.

2. The system of claim 1, wherein the yarns are in a pattern and the pattern is an "S" pattern.

3. The system of claim 1, the circuitry is configured to detect a sequence of locations of the magnetic yarn underneath the sensor array.

4. The system of claim 3, the circuitry is configured to compare the detected sequence of locations with an expected sequence of locations to determine a rip in the conveyor belt.

5. The system of claim 1, the conveyor belt comprises an elastomeric material.

6. The system of claim 1, the circuitry configured to determine a length of a rip and a location of the rip.

7. The system of claim 1, the circuitry configured to determine a conveyor belt speed based on at least two marker locations.

8. The system of claim 1, the series of sensors comprising a series of Hall or magnetic sensors.

9. The system of claim 1, where the monitoring system is subject to dust, debris and heat.

10. The system of claim 1, the circuitry configured to detect rips, speed and location based on a sine wave pattern of the magnetic yarn.

11. The system of claim 1 the circuitry configured to signal conveyor belt characteristics using the transceiver.

12. The system of claim 1, the codings are binary codings.

13. The system of claim 1, a first marker of the plurality of markers has a first orientation that corresponds with a first coding and a second marker of the plurality of markers has a second orientation that corresponds with a second coding.

* * * * *